United States Patent
Fish et al.

(10) Patent No.: US 8,572,976 B2
(45) Date of Patent: Nov. 5, 2013

(54) REDUCED STRESS INTERNAL MANIFOLD HEAT SHIELD ATTACHMENT

(75) Inventors: Jason Fish, Brampton (CA); Bhawan B. Patel, Mississauga (CA); Saeid Oskooei, Toronto (CA)

(73) Assignee: Pratt & Whitney Canada Corp., Longueuil (CA)

( * ) Notice: Subject to any disclaimer, the term of this patent is extended or adjusted under 35 U.S.C. 154(b) by 1888 days.

(21) Appl. No.: 11/538,670

(22) Filed: Oct. 4, 2006

(65) Prior Publication Data

US 2008/0083225 A1    Apr. 10, 2008

(51) Int. Cl.
*F02C 1/00*    (2006.01)

(52) U.S. Cl.
USPC .......................................................... 60/739

(58) Field of Classification Search
USPC ......... 60/734, 739, 740; 239/128, 288, 288.3, 239/288.5, 533.2
See application file for complete search history.

(56) References Cited

U.S. PATENT DOCUMENTS

| | | |
|---|---|---|
| 2,151,540 A | 3/1939 | Varga |
| 2,946,185 A | 7/1960 | Bayer |
| 3,213,523 A | 10/1965 | Boehler |
| 3,472,025 A | 10/1969 | Simmons et al. |
| 4,100,733 A | 7/1978 | Striebel et al. |
| 4,322,945 A | 4/1982 | Peterson et al. |
| 4,327,547 A | 5/1982 | Hughes et al. |
| 4,404,806 A | 9/1983 | Bell, III et al. |
| 4,483,137 A | 11/1984 | Faulkner |
| 5,036,657 A | 8/1991 | Seto et al. |
| 5,253,471 A | 10/1993 | Richardson |
| 5,271,219 A | 12/1993 | Richardson |
| 5,396,759 A | 3/1995 | Richardson |
| 5,400,968 A | 3/1995 | Sood |
| 5,419,115 A | 5/1995 | Butler et al. |
| 5,423,178 A | 6/1995 | Mains |
| 5,570,580 A | 11/1996 | Mains |
| 5,579,645 A | 12/1996 | Prociw et al. |
| 5,598,696 A | 2/1997 | Stotts |
| 5,737,921 A | 4/1998 | Jones et al. |
| 5,771,696 A | 6/1998 | Hansel et al. |
| 5,848,525 A | 12/1998 | Spencer |
| 5,956,955 A | 9/1999 | Schmid |
| 5,983,642 A | 11/1999 | Parker et al. |

(Continued)

FOREIGN PATENT DOCUMENTS

| | | |
|---|---|---|
| CA | 1013153 | 7/1977 |
| CA | 2307186 | 5/1999 |

(Continued)

OTHER PUBLICATIONS

U.S. Appl. No. 11/220,849, Prociw et al.

(Continued)

*Primary Examiner* — Phutthiwat Wongwian
(74) *Attorney, Agent, or Firm* — Norton Rose Fulbright Canada LLP

(57) ABSTRACT

A fuel manifold assembly for a gas turbine engine fuel system comprises a fuel manifold at least partly enclosed by a heat shield, the internal manifold being made of a first material having a first coefficient of thermal expansion, and the heat shield being made of a second material having a second coefficient of thermal expansion that is lower than the first coefficient of thermal expansion.

8 Claims, 3 Drawing Sheets

(56) References Cited

U.S. PATENT DOCUMENTS

| | | |
|---|---|---|
| 5,996,335 A | 12/1999 | Ebel |
| 6,109,038 A | 8/2000 | Sharifi et al. |
| 6,141,968 A | 11/2000 | Gates et al. |
| 6,149,075 A | 11/2000 | Moertle et al. |
| 6,240,732 B1 | 6/2001 | Allan |
| 6,256,995 B1 | 7/2001 | Sampath et al. |
| 6,463,739 B1 | 10/2002 | Mueller et al. |
| 6,761,035 B1 | 7/2004 | Mueller |
| 6,915,638 B2 * | 7/2005 | Runkle et al. .................. 60/740 |
| 7,028,484 B2 | 4/2006 | Prociw et al. |
| 2003/0014979 A1 | 1/2003 | Summerfield et al. |
| 2005/0188699 A1 | 9/2005 | Shafique et al. |
| 2006/0156731 A1 | 7/2006 | Prociw et al. |
| 2006/0156733 A1 | 7/2006 | Prociw et al. |
| 2006/0218925 A1 | 10/2006 | Prociw et al. |

FOREIGN PATENT DOCUMENTS

| | | |
|---|---|---|
| EP | 0660038 | 6/1995 |
| EP | 0939275 | 9/1999 |
| GB | 2404976 | 2/2005 |
| WO | WO 9504244 | 2/1995 |

OTHER PUBLICATIONS

U.S. Appl. No. 11/465,655, Morenko.
U.S. Appl. No. 11/489,533, Morenko.
U.S. Appl. No. 11/366,815, Olver.
U.S. Appl. No. 11/366,816, Fish.
U.S. Appl. No. 11/366,814, Patel et al.
U.S. Appl. No. 11/466,137, Fish et al.
U.S. Appl. No. 11/513,030, Morenko et al.
U.S. Appl. No. 11/532,611, Rudrapatna et al.
U.S. Appl. No. 11/535,185, Morenko et al.
U.S. Appl. No. 11/534,381, Fish et al.
U.S. Appl. No. 11/552,240, Patel et al.

* cited by examiner

REDUCED STRESS INTERNAL MANIFOLD HEAT SHIELD ATTACHMENT

TECHNICAL FIELD

The invention relates generally to a gas turbine engine and, more particularly to gas turbine engine fuel manifolds and methods of manufacturing same.

BACKGROUND OF THE ART

A fuel carrying member such as an internal manifold of a gas turbine engine must survive inside a hot environment while protecting the fuel flowing therein from being subjected to high temperatures. To accomplish this, a heat shield is used around the internal manifold to minimize convective heat transfer thereto. Typically, the heat shield is attached to the internal manifold by welding or brazing techniques. However, as the heat shield is exposed to much higher temperatures than the internal manifold, causing thermal growth differential generated stresses to develop at the joints between the parts. Thus, it is necessary for the joint between the heat shield and the internal manifold to be durable.

Accordingly, improvements are desirable.

SUMMARY OF THE INVENTION

It is therefore an object of this invention to provide an improved internal manifold and heat shield assembly.

In one aspect, the present invention provides a fuel manifold assembly for a gas turbine engine comprising a fuel manifold at least partly enclosed by a heat shield, the fuel manifold being made of a first material having a first coefficient of thermal expansion and the heat shield being made of a second material having a second coefficient of thermal expansion that is lower than the first coefficient of thermal expansion, such that differential thermal growth between the internal manifold and the heat shield at engine operating temperatures is reduced.

There is also provided, in accordance with another aspect of the present invention, a method of reducing thermally-generated stress at a joint between a fuel manifold and a heat shield of a fuel manifold assembly in a gas turbine engine, the method comprising: selecting a first material having a first coefficient of thermal expansion for the fuel manifold; and selecting a second material having a second coefficient of thermal expansion for the heat shield, the second coefficient of thermal expansion being lower than the first coefficient of thermal expansion.

There is further provided, in accordance with another aspect of the present invention, a fuel injection system for gas turbine engine including a compressor, a combustor and a turbine, comprising: an annular internal fuel manifold disposed adjacent the combustor within a surrounding engine casing, the fuel manifold having at least one fuel conveying passage therein in fluid flow communication with a plurality of fuel injection nozzles disposed along the fuel manifold and adapted to spray fuel into the combustor, and a fuel inlet connected to the fuel manifold and providing fuel flow to the fuel conveying passage, the fuel manifold being made of a first material having a first coefficient of thermal expansion; and an annular heat shield at least partially covering the fuel manifold about the circumference thereof and fastened thereto by at least one joint, the heat shield being made of a second material having a second coefficient of thermal expansion that is lower than the first coefficient of thermal expansion, such that differential thermal growth between the fuel manifold and the heat shield at engine operating temperatures is limited.

Further details of these and other aspects of the present invention will be apparent from the detailed description and figures included below.

DESCRIPTION OF THE DRAWINGS

Reference is now made to the accompanying figures depicting aspects of the present invention, in which.

DETAILED DESCRIPTION OF THE PREFERRED EMBODIMENTS

Figure 1:
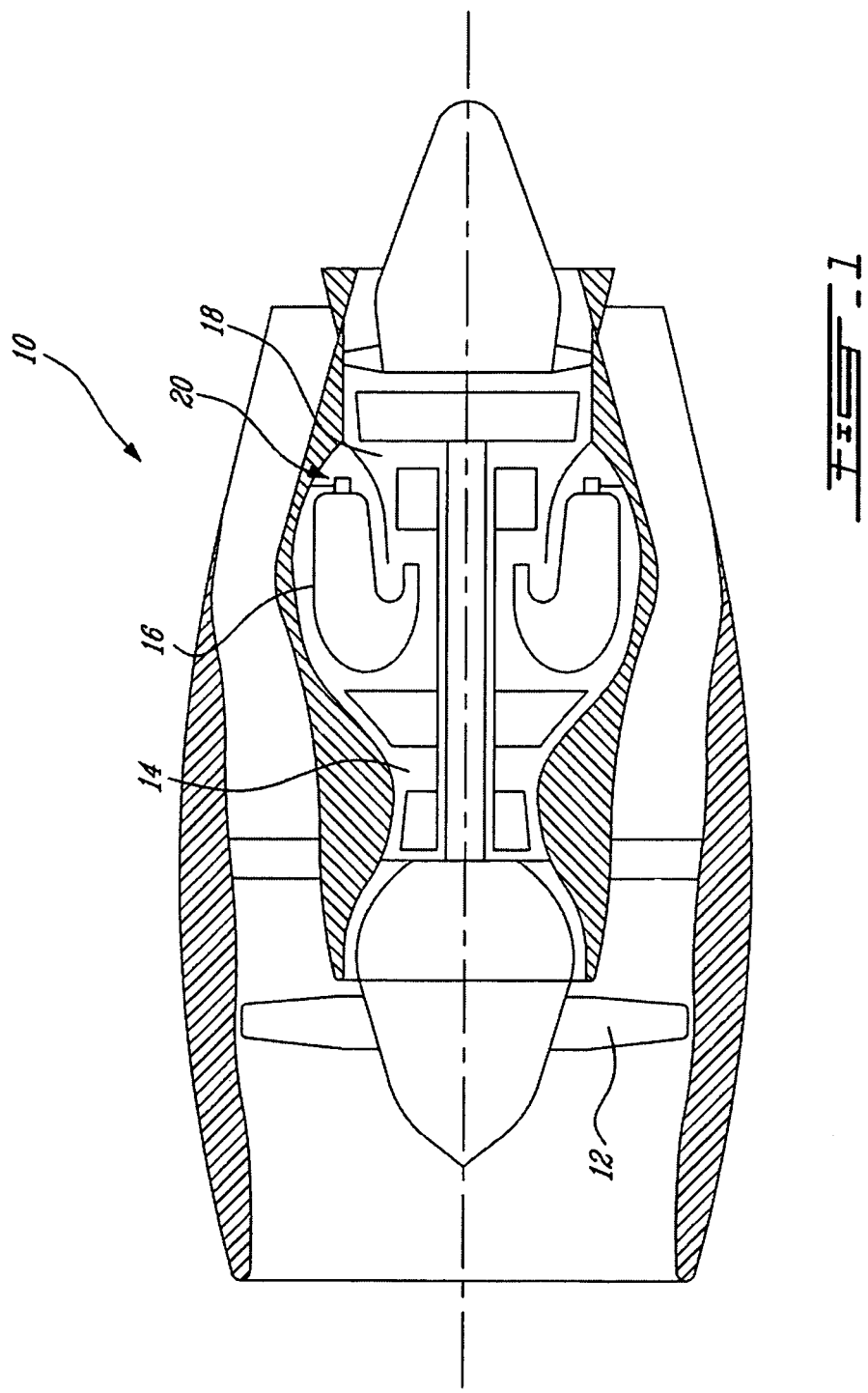
FIG. 1 is a schematic cross-sectional view of a gas turbine engine.

FIG. 1 illustrates a gas turbine engine 10 generally comprising, in serial flow communication, a fan 12 through which ambient air is propelled, a multistage compressor section 14 for pressurizing the air, a combustion section 16 in which the compressed air is mixed with fuel atomized, the mixture being subsequently ignited for generating hot combustion gases before passing through a turbine section 18 for extracting energy from the combustion gases.

Fuel is injected into the combustor 16 of the gas turbine engine 10 by a fuel injection system 20 which is connected in fluid flow communication with a fuel source (not shown) and is operable to inject fuel into the combustor 16 for mixing with the compressed air from the compressor 14 and ignition of the resultant mixture.

Figure 2:
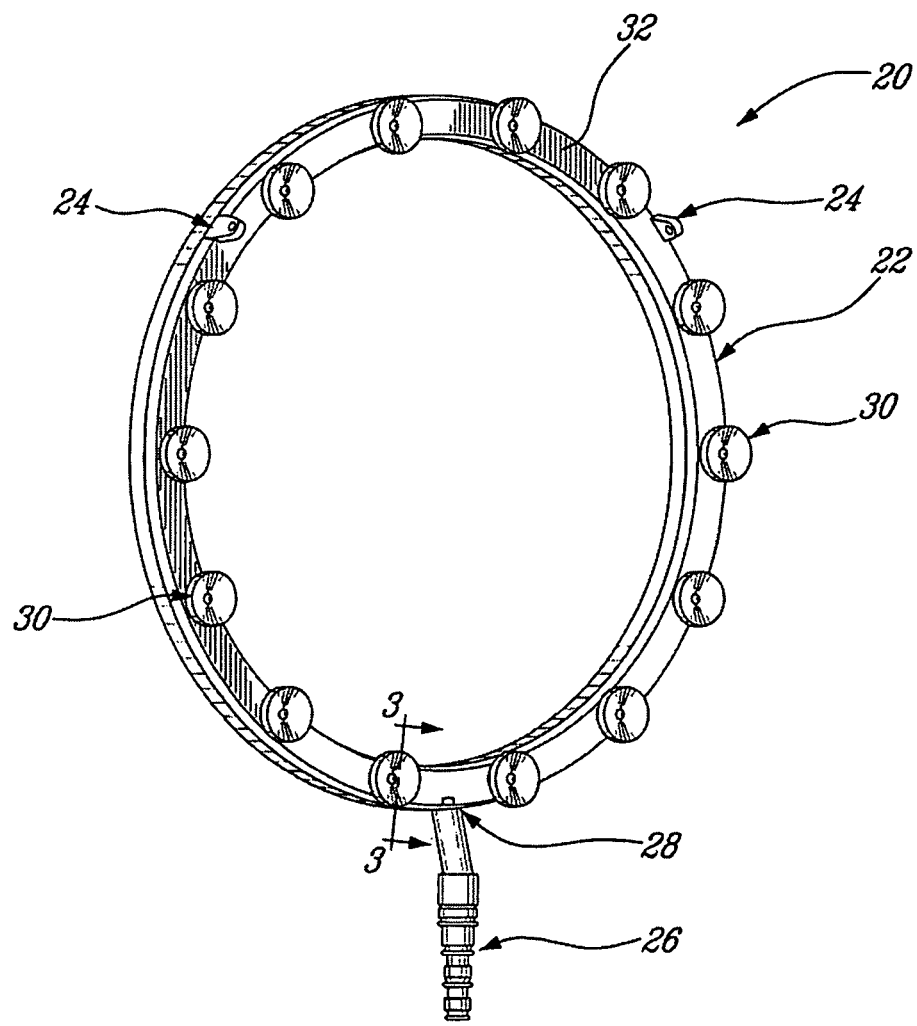
FIG. 2 is a perspective view of an internal fuel manifold assembly in accordance with one aspect of the present invention, for use in a gas turbine engine such as that shown in FIG. 1.
Figure 3:
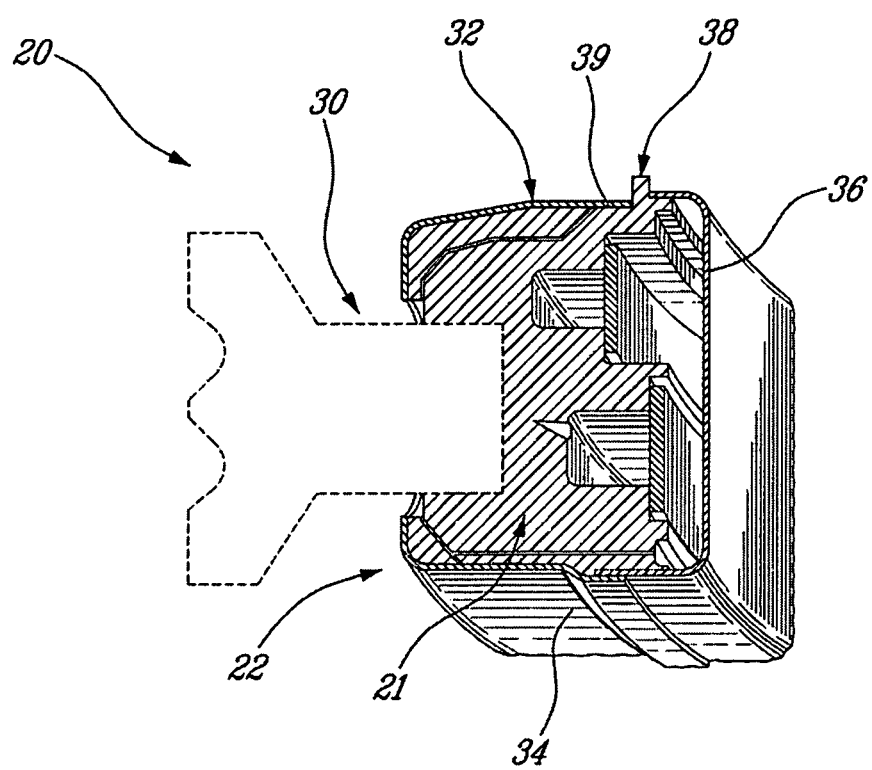
FIG. 3 is a perspective cross-sectional view of the internal fuel manifold assembly of FIG. 2, taken through line 3-3 thereof.

Referring to FIGS. 2 and 3, the fuel injection system 20 comprises at least one fuel conveying member through which fuel flows. In the exemplary embodiment, the fuel injection system 20 includes an annular internal manifold assembly 22 having a ring shape which is mounted adjacent to the combustor 16 in the gas turbine engine 10. The internal manifold assembly 22 is preferably mounted to the combustor 16 or to surrounding support structure via several integral attachment lugs 24 which receive pins (not shown) engaged to the support structure. This provides a mounting mechanism which allows for thermal expansion of the internal manifold at high temperatures. The fuel manifold assembly 22 includes a solid fuel manifold ring 21 defining at least one fuel flow passage therein which is in fluid flow communication with a plurality of fuel nozzles 30 mounted to the fuel manifold 21, and a heat shield 32 which at least partially covers the fuel manifold 21 therein. Preferably, the heat shield 32 covers almost the entire inner fuel manifold 21, such as to protect it from the high temperatures of the combustor and the area surrounding the combustor in the engine. A fuel inlet pipe 26 provides fuel to the internal manifold 21, via inlet 28, which then distributes the fuel supply to nozzles 30. The nozzles 30 can be directly mounted to the internal manifold 22.

Referring now to FIG. 3 in more detail, the outer heat shield 32 of the fuel manifold assembly 22 covers the fuel manifold ring 21 disposed therewithin. Particularly, in at least one embodiment the heat shield 32 is provided as a two-part shield, having a front segment 34 and a rear segment 36 for enclosing the internal manifold 22 as clearly shown in FIG. 3.

However, in an alternate embodiment the heat shield 32 maybe in fact composed of a single component, provide installation thereof onto the fuel manifold 21 remains possible. In the embodiment depicted in which the two-part heat shield is used, the internal manifold 22 is provided with an inner circumferential lip 38 protruding radially inwardly from an inner circumferential surface 39 of the fuel manifold ring 21. The circumferential lip 38 provides a mounting point to which the front and rear heat shield segments 34 and 36 are fastened, by way of suitable method such as brazing or welding for example. As the contact between the heat shield 32 and the fuel manifold 21 is limited generally to the lip 38, the conductive heat transfer therebetween is accordingly limited. Further, as the interconnection between the heat shield and fuel manifold is limited to a relative confined area, simpler manufacturing of the assembly is possible (i.e. the welds or braze used to fasten the heat shield to the manifold are confined to a limited and relatively accessible region of the assembly.

Thus, the heat shield 32 provides the fuel manifold 21 thermal protection from the high temperature environment of the combustor 16 and the hot surrounding region within the gas turbine engine. The heat shield 32 is therefore exposed to higher temperatures than the fuel manifold 21 disposed therewithin. For example, typical temperatures to which the heat shield 32 can be exposed to during engine operation can be between 700 and 800 degrees F., while the fuel manifold 21 would be exposed to temperatures ranging between about 300 to 400 degrees F. Nevertheless, both the heat shield 32 and the fuel manifold 22 are subjected to thermal stresses and strains resulting from expansion and contraction thereof as a function of temperature.

It is well known that most solids expand in response to heating and contract upon cooling. The degree to which a given material responds to temperature change by expanding and contracting is expressed as its coefficient of thermal expansion. The coefficient of thermal expansion is generally defined as the fractional increase in length per unit rise in temperature.

It is generally known in the art to provide a heat shield made out of the same material as the internal manifold so as to facilitate welding the two parts together. However, stresses develop at the joints between the two parts due to the fact that the heat shield is exposed to higher temperatures, causing it to experience greater thermal growth than the internal manifold.

In the fuel manifold assembly 22 of the present embodiment, the fuel manifold 21 thereof is made of a first material having a first coefficient of thermal expansion and the heat shield 32 is made of a second material having a second coefficient of thermal expansion that is lower than the first coefficient of thermal expansion of the first material. Accordingly, the differential thermal growth between the two parts is reduced as the heat shield will expand less than the internal manifold for a given temperature.

For example, in one exemplary embodiment wherein the fuel manifold 21 is made of 347 stainless steel (SST) and the heat shield 32 is made of Inconel 625, the internal manifold 22 can have a coefficient of thermal expansion ranging from about $9.2 \times 10^{-6}$ in/in/deg F. to about $9.4 \times 10^{-6}$ in/in/deg F. and the heat shield can have a coefficient of thermal expansion ranging from about $7.53 \times 10^{-6}$ in/in/deg F. to about $7.6 \times 10^{-6}$ in/in/deg F. Thus, in this specific example, the fuel manifold ring 21 grows approximately 0.0205 inches radially when subjected to an increase in temperature from 300 to 400 degrees F. The heat shield 32 grows approximately 0.033 inches radially when subjected to an increase in temperature from 700 to 800 degrees F. thereby yielding a differential thermal growth of approximately 0.012 inches.

By making the heat shield 32 from a material with a lower coefficient of thermal expansion than the fuel manifold 21, the higher temperatures to which the heat shield 32 is exposed during engine operation is at least partially compensated by the lower coefficient of thermal expansion thereof relative to that of the fuel manifold ring 21, which is itself exposed to lower temperatures. Thus, less thermal growth differential therebetween will result, and therefore the joint holding the two parts together is subjected to less thermally-generated stresses and strains.

The above description is meant to be exemplary only, and one skilled in the art will recognize that changes may be made to the embodiments described without department from the scope of the invention disclosed. For example, materials differing from those exemplified above can be used to control the differential thermal growth between the internal manifold and the heat shield. Still other modifications which fall within the scope of the present invention will be apparent to those skilled in the art, in light of a review of this disclosure, and such modifications are intended to fall within the appended claims.

What is claimed is:

1. A fuel manifold assembly for a gas turbine engine comprising a fuel manifold at least partly enclosed by a heat shield, the fuel manifold being made entirely of a first material and the heat shield being made entirely of a second material that is different from the first material, said first material having a first coefficient of thermal expansion and said second material having a second coefficient of thermal expansion that is lower than the first coefficient of thermal expansion such that the heat shield expands less than the fuel manifold when exposed to the same temperature, wherein differential thermal growth between the internal manifold and the heat shield at engine operating temperatures is reduced.

2. The fuel manifold assembly as defined in claim 1, wherein at least one joint fastens the heat shield to the internal manifold, said reduced differential thermal growth between the first and second materials reducing thermally-generated stress at the at least one joint.

3. The fuel manifold assembly as defined in claim 1, wherein the first material has a coefficient of thermal expansion ranging between about $9.2 \times 10^{-6}$ in/in/deg F to about $9.4 \times 10^{-6}$ in/in/deg F and the second material has a coefficient of thermal expansion ranging between about $7.53 \times 10^{-6}$ in/in/deg F to about $7.6 \times 10^{-6}$ in/in/deg F.

4. The fuel manifold assembly as defined in claim 1, wherein the fuel manifold is annular and a circumferentially extending lip protrudes radially inwardly from the fuel manifold, the heat shield being fastened to the fuel manifold exclusively along said lip.

5. A method of reducing thermally-generated stress at a joint between a fuel manifold and a heat shield of a fuel manifold assembly in a gas turbine engine, the method comprising: selecting a first material having a first coefficient of thermal expansion for the fuel manifold; and selecting a second material having a second coefficient of thermal expansion for the heat shield, the second coefficient of thermal expansion being lower than the first coefficient of thermal expansion; and permitting the heat shield to expand less than the fuel manifold when exposed to the same temperature, which reduces differential thermal growth between the internal manifold and the heat shield at engine operating temperatures and thereby reduces thermally-generated stress at the joint between the fuel manifold and the heat shield.

6. The method as defined in claim 5, further comprising the step of determining an acceptable differential thermal growth between the internal manifold and the heat shield and selecting a first and a second material to achieve the acceptable differential thermal growth.

7. A fuel injection system for gas turbine engine including a compressor, a combustor and a turbine, comprising:
   an annular internal fuel manifold disposed adjacent the combustor within a surrounding engine casing, the fuel manifold having at least one fuel conveying passage therein in fluid flow communication with a plurality of fuel injection nozzles disposed along the fuel manifold and adapted to spray fuel into the combustor, and a fuel inlet connected to the fuel manifold and providing fuel flow to the fuel conveying passage, the fuel manifold being made entirely of a first material having a first coefficient of thermal expansion; and
   an annular heat shield at least partially covering the fuel manifold about the circumference thereof and fastened thereto by at least one circumferentially extending joint, the heat shield being made of a second material having a second coefficient of thermal expansion that is lower than the first coefficient of thermal expansion, such that the heat shield expands less than the fuel manifold when exposed to the same temperature and wherein differential thermal growth between the fuel manifold and the heat shield at engine operating temperatures is reduced.

8. The fuel injection system as defined in claim 7, wherein a circumferentially extending lip protrudes radially inwardly from the fuel manifold, the heat shield being fastened to the fuel manifold exclusively along said lip by said circumferentially extending joint.

* * * * *